March 2, 1926.

J. F. KOHLER 1,575,214

PIE MAKING MACHINE

Filed August 22, 1923    4 Sheets-Sheet 1

March 2, 1926. 1,575,214
J. F. KOHLER
PIE MAKING MACHINE
Filed August 22, 1923 4 Sheets-Sheet 3

March 2, 1926.

J. F. KOHLER

1,575,214

PIE MAKING MACHINE

Filed August 22, 1923   4 Sheets-Sheet 4

INVENTOR
John F. Kohler

BY
Charles G. Hensley
ATTORNEY

Patented Mar. 2, 1926.

1,575,214

UNITED STATES PATENT OFFICE.

JOHN F. KOHLER, OF LARCHMONT MANOR, NEW YORK.

PIE-MAKING MACHINE.

Application filed August 22, 1923. Serial No. 658,705.

*To all whom it may concern:*

Be it known that I, JOHN F. KOHLER, a citizen of the United States, and a resident of Larchmont Manor, in the county of Westchester and State of New York, have invented certain new and useful Improvements in Pie-Making Machines, of which the following is a specification.

My invention relates to pie-making machinery more particularly to a machine for trimming the dough which is to form the bottom crust of the pie and to roll in the edge of the dough to form a rim and also to crimp the rim to form the dough into condition to produce a pie crust equal or superior to the hand made product in every respect. In the present machine all of these operations are performed mechanically and automatically. In pie machines, as heretofore made, a die cooperated with the pie plate to force the layer of dough, which was primarily much thicker than the completed article, in such a manner that a portion of the dough which was placed between the pie plate and the die was forced outwardly around the edge and this squeezed-out portion of the dough was utilized for making the rim in connection with a roller which moved around the die and pie plate. Not only is the output of such a machine limited but one of the greatest objections is that the sheet of dough used had to be much thicker than is desired and as a result the bottom crust in a pie made from that dough was undesirably thick and in the baking process it very often came out soggy. With the present machine while there is no limitation to the thickness of the sheet of dough used, nevertheless, I am able to use a much thinner sheet of dough than in the former machines referred to and at the same time I am able to form a superior flange and to crimp that flange in a very regular and pleasing pattern. In addition to these advantages, I am able to increase the output of the machine to a point where the machine will operate as fast as sheets of dough can be successfully applied upon the pie plates. The principal reason why I am able to obtain these results is that instead of forcing a relatively thick sheet of dough outwardly from between the die and pie plate by great pressure the present machine is arranged to cut from a sheet of dough which is initially larger than the pie plate a disk of larger circumference than the pie plate and the flange is built up by turning and rolling this surplus or projecting portion of the dough into the space between the rim of the pie plate and the cooperating die member. In this manner I arrive at a more desirable result and in the quickest possible time. It may be pointed out that with the present machine there is no excessive pressure or squeezing of the dough and it is a well known fact that the less pressure and squeezing there is in the handling of the dough the lighter and more flaky will be the pie crust made from the dough.

In addition to forming the flange, the present machine is also adapted to crimp the rim after it has been formed and this operation takes place simultaneously with the formation of the rims; except that the crimping operation takes place on each plate after it has moved from the position near the rim forming device so that while these two devices are performing their functions simultaneously they are acting on different pie plates at a given time.

Another object of my invention is to provide a machine for carrying out the above objects which will be continuous in its operation and in which the conveyer which carries the pie plates through the several operations may be moved continuously. For this purpose I prefer to arrange the rim forming and crimping devices on a movable carriage or support and to reciprocate these devices so that they move with the plate conveyor while they are performing their operations and then return to perform similar operations on successive plates.

Other objects and advantages will be apparent from the following detailed description of one form of my invention.

In the drawings forming a part of this application.

In the drawings I have shown the machine parts mounted on a frame 1 composed of tubes and couplings or brackets the form of which frame is immaterial so long as it supports the parts in the following operative relationship. I have shown journaled in brackets 2 on this frame the main shaft 3 which is driven by any suitable source of power and I have indicated pulleys 4 on this shaft which may be operated from a belt by any source of power or the shaft may be operated by an electric motor. The operating force for the various parts of the machine is taken from this main shaft 3. At the left hand end of Figure 1 I have shown a shaft 5 journaled in brackets 6 and on this shaft are arranged in spaced relation the sprocket wheels 7, 8, which revolve with this shaft. At the right hand end of Figure 1 I have shown a similar shaft 9 which shaft is parallel with the shaft 5 and it is also provided with a pair of sprocket wheels 10, 11 which revolve with this shaft. There are two endless chains, one of which 12 travels over the sprockets 7, 10, and the other chain 13 travels around the sprockets 8, 11. At regular intervals there are arranged between these chains the plate supports 14 which consist of flat members each of which is provided with an aperture 15 in which the pie plate rests on the top surface of the support 14 adjacent the edge of the opening 15. Each support 14 at its forward end and at each side has a small bracket 17 extending at right angles to the support and the parallel chains have corresponding brackets 18; and pivot bolts 19 pass through these respective brackets and form a pivotal support for the forward or leading end of the support 14. The rear end of each support simply rests on a pair of pintles 20 which are carried by the chains.

On the main shaft 3 there is a sprocket wheel 21 around which travels the chain 22. This chain also travels around a sprocket 23 on the shaft 5 and through these members continuous operation is imparted to the shaft, to propel the conveying mechanism in such direction that the top run of the conveyer chains 12, 13, move to the left in Figure 1.

Figures 3, 4:
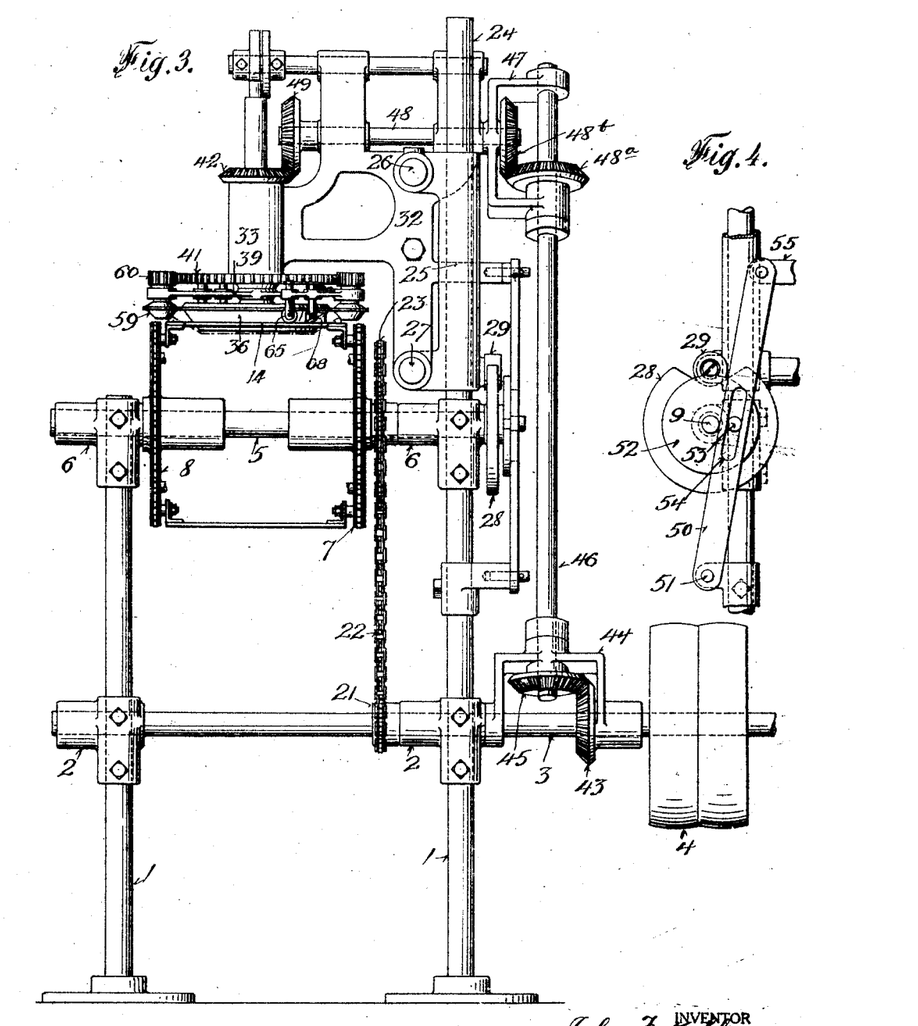
Figure 3 is an end view of the machine.
Figure 4 is an enlarged detailed view of the cam mechanism for reciprocating the rim-forming and crimping devices.

The upper extensions 24 of the frame 1 form the vertical guides for the movable carriage. Reciprocating vertically on these posts are the sleeves 25 which form a part of the movable carriage. Between these sleeves 25 are connected the horizontal and parallel shafts 26, 27 which, together with the sleeves, form a rectangular frame or carriage which moves vertically and is guided by the post members 24. Near each end of the carriage there is a cam 28 and on each end of the movable carriage there is a roller 29 and the latter are operated upon by the cams 28 to periodically and bodily lift the carriage. Through this mechanism an up and down or vertical movement is imparted to the rim forming and crimping devices in order to periodically bring them into operative relation to the pie plates and to move them away to allow successive plates to be brought into operative positions. On the upper horizontal shaft 26 there is arranged a sliding sleeve 30 and on the lower horizontal shaft 27 there is a corresponding sliding sleeve 31 both of which are connected together by a bracket 32 so that these parts move as a unit. There is a bearing hub 33 carried by the bracket 32 and extending through this hub and having suitable bearing therein I have provided the following:

In the interior there is a rod 34 which projects below the hub and its lower end is adapted to press against the pie plate to eject it from the die. Surrounding this rod 34 there is a sleeve 35 which carries the die member 36 which latter cooperates with the pie plate to press the sheet of dough into the form necessary to constitute the lower crust of a pie. Surrounding the sleeve 35 there is another sleeve 37 which supports and carries the hub 38 from which project in opposite directions the arms 39 on which the rim forming members are carried. Surrounding the sleeve 37 there is another sleeve 40 and this supports a stationary gear wheel 41. Above the hub 33 there is a gear 42 which is secured to the sleeve 37 which latter is the one which carries the arms 39. The sleeve 37 is revolved in the following manner. On the main shaft 3 there is a gear 43 and surrounding this there is a yoke 44 which carries the mitre gear 45 which meshes with and is operated by the gear 43. The yoke 44 is adapted to pivot on the main shaft 3 but the gear 43 is pinned to this shaft. The gear 45 is fixed to the lower end of the inclined shaft 46 one end of which has its bearing in the yoke 44. The upper end of this shaft has its bearing in the two arms of a yoke 47 which is pivoted upon a horizontal shaft 48. There is a mitre gear 49 on the shaft 48 and this meshes with and drives the mitre gear 42 which is fixed to the sleeve 37. It will be noted that the shaft 46 is adapted to slide lengthwise in the arms of the yoke 47 and this, together with the pivotal motions of the yoke 44 and the yoke 47 makes it possible for the shaft 48 to move vertically and horizontally in relation to the inclined shaft 46 without interfering with the driving operation of the shaft 48. The latter shaft, 48, has its bearings in the portion which meshes with and operates the gear 42 and through these several parts revolving motion is continually imparted to the sleeve 37 and therefore to the arms 39. In addition to the reciprocating, vertical motion imparted to the carriage I also impart a horizontal reciprocating motion to the frame 32. For this purpose I have shown the lever 50 pivoted to a bracket at 51 on the stationary frame of the machine, and there is a disk 52 fixed to the shaft 9 and it has a pin 53 which engages in the slot 54 of this lever 50. At each revolution of the disk 52 the lever 50 is moved to the right and left in Figure 4. The upper end of the lever 50 has pivotally connected to it a link 55 which is also pivoted at one end 56 to the sliding frame 32. It will be obvious that as the lever 50 rocks this will cause the sliding frame 32 together with the sleeves 30, 31, which are guided on the shafts 26, 27 to reciprocate lengthwise of the machine and this motion may take place independently of the up and down movement of the carriage as a whole.

Figure 12:
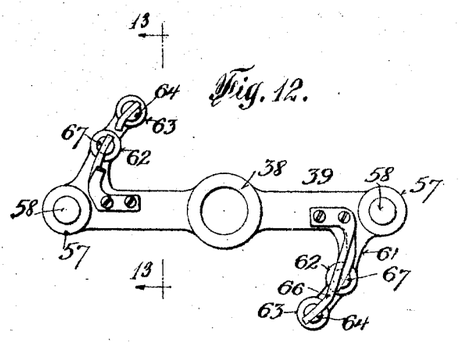
Figure 12 is a plan view of the arm which carries the rim forming members.
Figure 13:
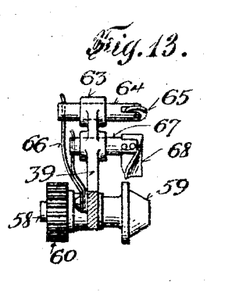
Figure 13 is a sectional view taken on the line 13—13 of Figure 12.

In the outer end of each of the arms 39 there is journaled in the hubs 57 a stud 58 on which is carried the vertically disposed cone shaped forming roller 59. In the preferred form of my machine shown herein there is a cone forming roller on each arm 39 and therefore these rollers will operate upon the entire circumference of the die and pie plate for each half revolution of the sleeve 37. It is to be understood that I do not wish to limit my invention to the use of any particular number of forming rollers because one or any other number may perform this work and I have selected two merely because the work can be performed quicker than with one and because two will perform the work as fast as the pie plates can be reasonably fed through the machine. Each stud 58 which carries a forming roller is provided with a pinion 60 which meshes with the gear 41 so that as the arms 39 rotate and as the gear 41 is stationary, the forming rollers 59 are caused to revolve on their own axes in addition to rotating with the arms 39 about their axes. Each arm 39 carries an arcuate extension 61 which is provided with bosses 62, 63. In the boss 63, which is the one furthest from the forming roller, there is a vertically sliding spindle 64 in the lower end of which there is carried a cutting roller 65 which cooperates with the top surface of the plate supporting member 14 to cut the sheet of dough to the proper size. As the arms 39 revolve clockwise in Figure 12, the cutting rollers 65 will each precede their respective forming rollers 59 in their operations. The cutting roller 65 is pressed into contact with the plate support 14 by means of the spring pressing on the spindle 64. In each boss 62 there is a vertically sliding spindle 67 and on the lower end of this there is carried the blade or plow share 68 which follows immediately after the cutting roller 65 and which precedes the forming roller 59.

On the horizontal shafts 26, 27 of the movable carriage and toward the rear of the machine there are arranged the upper and lower sleeves 70, 71 connected by a bracket 72 to move as a unit; and this unit reciprocates along the shafts 26, 27 and it carries the mechanism for crimping the pie rim which has been previously formed by the rim forming mechanism. The bracket 72 is connected with the bracket 32 by a connecting rod 73 so that the reciprocating motion applied through the lever 50 to the bracket 32 is also applied to the bracket 72 so that the rim forming and the crimping mechanisms both reciprocate together on the carriage. There is a vertical shaft 74 journaled in the bearing member 75 on the sleeve 70 and on the lower end of this shaft there is a disk 76 which rests on a collar 77 secured to the shaft by the set screw 78. Around this disk at intervals there are arranged pins 79 on the ends of which there are sliding or telescoping sleeves 80 which are forced downwardly by the compression springs 81. The purpose of these pins is to press at various points against the rim of the pie plate in order to hold the plate flat against the plat support, as in many instances the plates are not perfectly flat and it is desirable that they be held so while the crimping device is operating. Above the disk 76 there is a second disk 82 which is movable toward and from the lower disk 76 and it is normally pressed upwardly by the coiled spring 83 which surrounds the shaft 74 and is compressed between the upper and the lower disks. This second disk 82 has an annular channel 84 in which there is a V-shaped cam ring 85 and the chamber 84 is closed at the bottom by a plate 86 having a series of slots 87. The lower disk has pairs of upturned apertured ears 88 and between each pair of ears there is pivoted a pair of levers 89 having upwardly extending arms 90 which are adapted to be actuated by the cam ring 85. The lower arms 91 of these levers are provided with crimping fingers 92. The parts are so arranged that when the carriage moves downwardly the pins 79 first engage the rim of the pie plate and then the crimping arms 91 approach the rim of dough while these arms are in divergent relation shown in Figures 7 and 8, and subsequently the disk member 82 moves toward the lower disk 76 and the cam ring 85 enters between all of the upper arms 90 of the several pairs of crimping levers 89 and as this motion continues these upper arms are forced apart and this causes the lower arms 91 to move toward each other and finally to pass each other. This action takes place after the crimping fingers have been lowered to a position where they engage the rim of dough previously formed by the rimming device. Upon the upper movement of the carriage the disk 82 moves away from the lower disk 76 so that the cam ring 85 withdraws from between the arms 90 of the crimping levers and the latter return to the position shown in Figure 8, either by gravity or by the action of suitable springs. A continuation of the upward movement of the carriage carries the entire crimping device away from the pie plate and the dough so that the pie plate may be advanced toward its discharge point.

*Operation.*

Figures 1, 2:
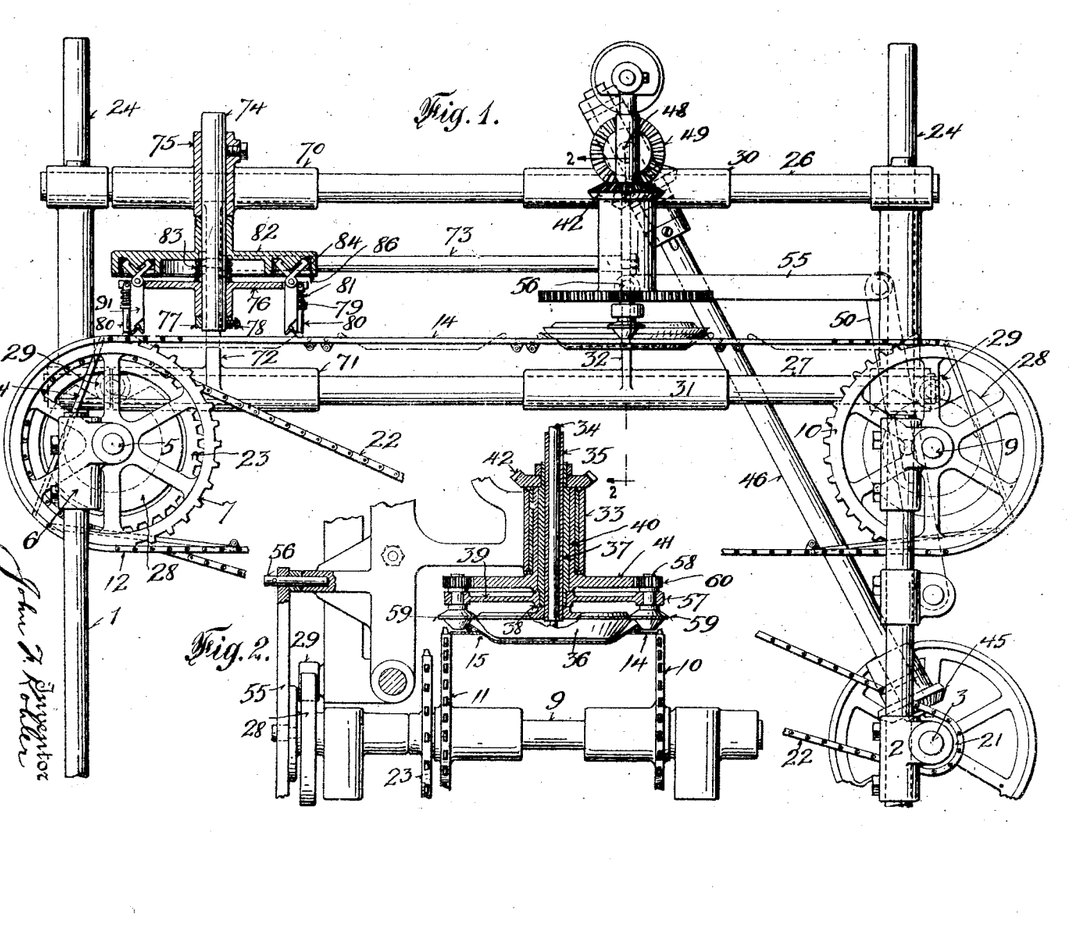
Figure 1 is an elevation of my improved machine with some parts shown in section.
Figure 2 is a sectional view taken on the line 2—2 of Figure 1.
Figures 5, 6, 7, 8:
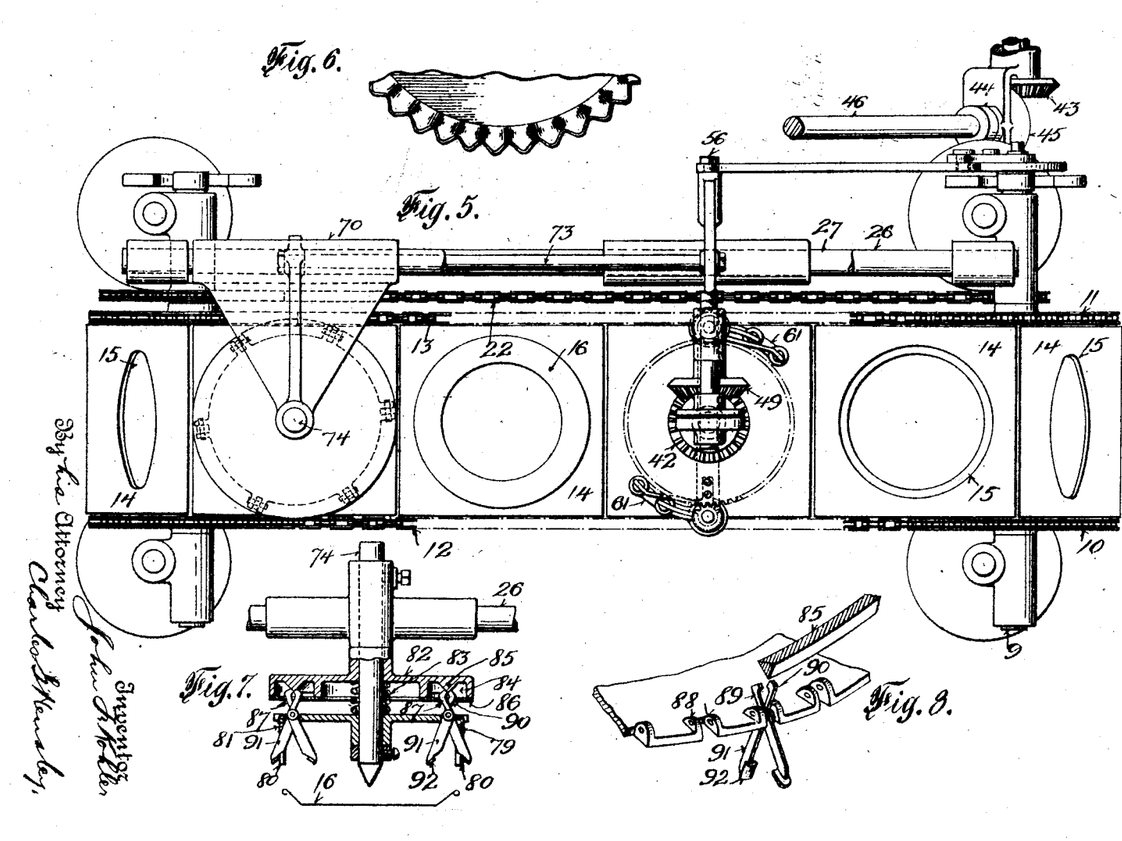
Figure 5 is a plan view of the machine.
Figure 6 is a plan view of a portion of a piece of dough formed on the present machine.
Figure 7 is a detailed sectional view of the crimping fingers and the ring for operating them.
Figure 8 is a perspective view thereof.
Figure 9:
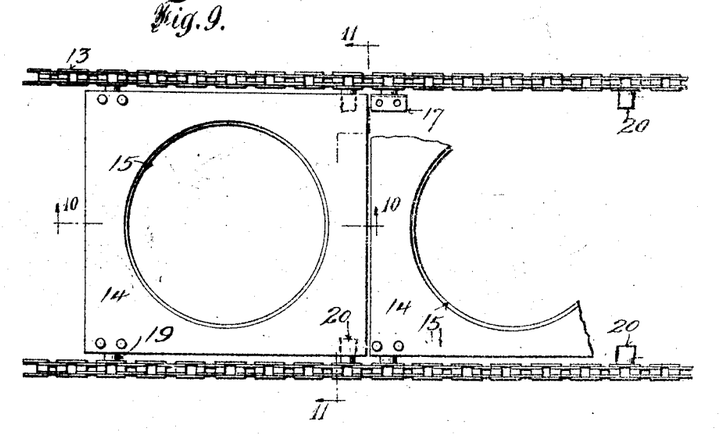
Figure 9 is a plan view of the plate carriers and conveying chains.
Figure 10:
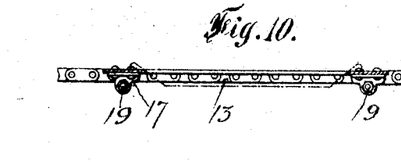
Figure 10 is a sectional view taken on the line 10—10 of Figure 9.
Figure 11:
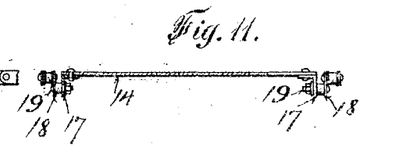
Figure 11 is a sectional view taken on the line 11—11 of Figure 9.

A pie plate with a thin sheet of dough, somewhat larger than the pie plate, is placed on each of the carriers or supports 14 at the right hand end of the machine in Figures 1 and 5 so that each plate lies in the aperture 15 with its flange resting on the top surface of the support. The plates may be fed to the machine either by hand or by automatic feeding means not shown and not forming any part of the present invention. The pie plates are conveyed continually upon the supports 14 while the latter are traveling with the upper runs of the chains 12, 13, until they reach the left hand end of the machine in Figures 1 and 5 and the pie plates are discharged from the support 14 while the latter are traveling around the sprockets 7 and 8 upon any suitable support or table, not shown.

Let it be assumed that the carriage is in the raised position and that a pie plate is being moved rearwardly by the conveyer and that the sleeves 30, 31 and the sleeves 70, 71 are in the extreme right hand position of Figure 1. The next movement which takes place will be the lowering of the carriage as the rollers 29 enter the recesses of the cams 28. This will take place while the rimming device is directly over one of the pie plates and while the crimping device is directly over another pie plate, which latter has previously been acted upon by the rimming device. As the carriage moves down, the die member 36 approaches the pie plate and presses against the sheet of dough which rests on the plate; and the pin 34 which projects through the bottom of the die member presses against the pie plate. The arms 39 are continually revolved by the power transmitted through the shaft 46 and the several gears 49 and 42 so that as the carriage approaches its lowest position the cutting rollers 65 come into contact with the top surface of the plate support 14 and they immediately commence to cut the sheet of dough on the arc of a circle larger than the circumference of the pie plate so that there is a portion of dough projecting beyond the edge of the pie plate. The blade or plow shares 68 following the rollers 65 turn this projecting portion of dough inwardly upon the flange of the pie plate adjacent to the outer edge of the die member 36. The forming roller 59 following immediately after the plow or blade 68 rolls this turned-in rim of dough into the space between the outer edge of the die member 36 and the flange of the pie plate and forms the dough into a flange of the desired shape. Where two arms 39 are employed as shown herein, the two sets of cutters, plows and forming rollers will act simultaneously at opposite sides of the pie plate so that when the arms 39 have made one half revolution the rim will have been completely formed. But should the arms 39 continue to revolve before the carriage moves upwardly it will have no further effect upon the dough. While these operations are taking place the sleeves 30, 31, the bracket 32, and the entire crimping device are moving rearwardly or from right to left in Figure 1 parallel with the supports 14 and at the same speed as the latter. About the time that the rimming device reaches the end of its movement to the left the carriage moves upwardly under the action of the cams 28 so that the rimming device disengages from the pie plate and while it is so disengaged, the rimming device is moved to the right in Figure 1 by the action of the lever 50 ready for the above operations to be repeated upon the next successive pie plate carried by the conveyor. When the carriage begins to move upwardly in the above described operations, the die 36 and the forming rollers 59 move upwardly to some extent before the pin 34 commences to rise so that the latter holds the pie plate upon the support 14 until the die and rollers 59 have disengaged from the dough and subsequently the pin 34 also rises from the pie plate. From the above it will be apparent that the dough from which the rim is formed is taken from the portion projecting beyond the die and pie plate when the cut is made, whereas, in former practice, the die had to squeeze out sufficient dough to form the rim. The latter was objectionable for the reasons pointed out above. It will be apparent that by changing the arc traveled by the cutters 65 the amount of dough provided for the rim will be regulated to suit the requirements. In other words, just sufficient dough will be cut to be rolled into the space between the outer edge of the die 36, the flange of the pie plate, and the forming roller 59. The waste or cut-off portion of the sheet of dough will simply lie on the support 14 and it will be discharged at the end of the conveyor. While the above operations are taking place the crimping operations are being performed upon the pie plate which has moved away from the rimming device.

In the above operations the sleeves, 70, 71 and the parts carried by them are in the extreme right hand position looking at the parts as in Figure 1, at the time that the carriage moves downwardly. At the commencement of this downward motion the crimping arms 91 are spread apart or open as shown in Figure 8 so that they approach the rim in such a manner that the two arms of each pair straddle the rim. After these arms come into this position in relation to the rim, the cam ring 85 moves downward with the disk 82 and it enters between the arms 90 of the levers 89 and forces these arms apart. This action moves the arms 91 toward each other and finally they cross in their paths so that the dough engaged by the several fingers 92 is crimped to produce an effect as represented in Figure 6. During this operation the crimping device as a whole is moving parallel with the pie plate and at the same speed. At the end of the crimping operation the carriage begins to move upwardly and this withdraws the cam ring 85 from the arms 90, allowing these to move toward each other and allowing the arms 91 to move back to their open or initial position. From the above it will be apparent that I provide automatic, mechanical means for forming the rim and for crimping it and that in doing so I may form the pie dough in a very thin sheet so that when finally baked the pie crust will be thin and flaky. This result is also assisted by the fact that the die 36 in the present case does not have to exert great pressure on the sheet of dough, in fact, the only pressure needed is just sufficient to press out irregularities in the thickness of the sheet of dough.

Having described my invention, what I claim is:

1. In a pie making machine the combination of means for holding a pie plate having a sheet of dough thereon; means for cutting the sheet of dough to a circumference larger than the finished product; means for turning in the projecting edge of the dough and means for forming the turned-in dough into a rim.

2. In a pie making machine the combination of means for holding a pie plate having a sheet of dough thereon of larger circumference than the finished product; a die member co-operating with the said plate to press the dough between said plate and die member; means for cutting the dough so as to leave a portion projecting over the plate; means for turning in the projecting portion of dough toward said die and plate, and a member for shaping the turned-in dough to form a rim.

3. In a pie making machine the combination of means for holding a pie plate having a sheet of dough thereon of larger circumference than the finished product; a die member co-operating with the said plate to press the dough between said plate and die member; means for cutting the dough so as to leave a portion projecting over the plate; means for turning in the projecting portion of dough toward said die and plate, and a roller for shaping the turned-in dough.

4. In a pie making machine the combination with means for holding a pie plate having a sheet of dough thereon of larger circumference than the finished product; a die co-operating with the said plate to press the dough; a cutting roller adapted to cut the sheet of dough whereby a portion projects from said plate; means for turning in the projecting portion of dough toward the die and plate; and a roller for forming the turned-in dough into a rim.

5. In a pie making machine the combination of a support adapted to hold a pie plate with the rim thereof resting on said support; a die co-operating with the said plate to press the sheet of dough thereon; means co-operating with said support to cut the sheet of dough whereby a portion projects beyond the plate; and means for turning in the projecting portion of dough between said plate and die member.

6. In a pie making machine the combination of a support adapted to hold a pie plate with the flange of the plate resting on said support; a die co-operating with said plate to press the sheet of dough; a revolving cutter co-operating with said support to cut the sheet of dough whereby a portion projects from the said plate and means for turning the projecting portion of the dough inwardly between said die and plate to form a rim.

7. In a pie making machine the combination of means for holding a pie plate; a die co-operating with the said plate to press the sheet of dough; means for cutting a sheet of dough into a disk of larger circumference than the finished product; means for turning the outer portion of said disk of dough inwardly between said die and plate; and means for revolving said cutting means and said turning-in means.

8. In a pie making machine the combination of means for holding a pie plate; a die co-operating with the said plate to press the sheet of dough; means for cutting a sheet of dough into a disk of larger circumference than the finished product; means for turning the outer portion of said disk of dough inwardly between the die and plate; and means for revolving said cutting and said turning-in means whereby the former operates immediately in advance of the latter.

9. In a pie making machine the combination of means for holding a pie plate; a die co-operating with said plate to press a sheet of dough; means for cutting a sheet of dough to a disk of larger circumference than the finished product; and means for turning the projecting edge of dough inwardly between the die and pie plate, comprising a curved blade acting on said dough adjacent and subsequent to said cutting means.

10. In a pie making machine the combination of a support adapted to hold a pie plate with the flange of the plate resting on the support; a die co-operating with the said plate to press a sheet of dough; a cutting member co-operating with said support to cut a disk of dough of larger circumference than the finished product; means for pressing the cutting means into contact with said support; a blade for turning the projecting edge of dough inwardly between the plate and die, and means for pressing said blade into contact with said support.

11. In a pie making machine the combination of a support adapted to hold a pie plate with the flange of the plate resting on the support; a die co-operating with the said plate to press a sheet of dough; means for cutting a sheet of dough into a disk of larger circumference than the finished product; means for turning the edge of said disk inwardly between the die and plate; a roller for rolling the turned-in dough between the die and plate; means for revolving said cutting, said turning in, and said rolling means around the pie plate and means for revolving said roller on its own axis.

12. In a pie making machine the combination of a support adapted to hold a pie plate with the flange of the plate resting on the support; a die co-operating with the said plate to press a sheet of dough; means for cutting a sheet of dough into a disk of larger circumference than the finished product; means for turning the edge of said disk inwardly between the die and plate; a roller for rolling the turned-in dough between the die and plate; means for revolving said cutting, said turning in, and said rolling means around the pie plate, and means for revolving said roller on its own axis, comprising a stationary gear, operating on a pinion carried with said roller.

13. In a pie making machine the combination of a support adapted to hold a pie plate with the flange of the plate resting on the support; a die co-operating with the said plate to press a sheet of dough; a plurality of cutting members for cutting a sheet of dough into a disk of larger circumference than the finished product; said cutting members acting simultaneously at different points of the circumference of the disk and a member for each cutting member, serving to turn the outer edge of the disk of dough inwardly between the die and the plate.

14. In a pie making machine the combination of a support adapted to hold a pie plate with the flange of the plate resting on the support; a die co-operating with the said plate to press a sheet of dough; a plurality of cutting members for cutting a sheet of dough into a disk of larger circumference than the finished product; said cutting members acting simultaneously at different points of the circumference of the disk, and a member for each cutting member serving to turn the outer edge of the disk of dough inwardly between the die and the plate, and a revolving forming roller following each turning in member, for rolling the turned in dough to form a rim.

15. In a pie making machine the combination of a movable support adapted to hold a pie plate; a die co-operating with the said plate to press a sheet of dough; means for cutting the dough into a disk of larger circumference than the finished product; means for turning in the projecting edge of said disk between the plate and die; means for reciprocating said die, said cutting means, and said turning in means, whereby they are caused to travel with the plate while forming a rim.

16. In a pie making machine the combination of a movable support adapted to hold a pie plate; a die co-operating with the said plate to press a sheet of dough; means for cutting the dough into a disk of larger circumference than the finished product; means for turning in the projecting edge of said disk between the plate and die; means for reciprocating said die, said cutting means, and said turning in means, whereby they are caused to travel with the plate while forming a rim; and means for moving said members vertically in relation to the path of movement of the plate whereby said members are moved into and out of operative relation with the plate.

17. In a pie making machine the combination of a continuously traveling support for a pie plate; a die member co-operating with said plate to press a sheet of dough; means for cutting the sheet of dough; means for turning the edge of the dough inwardly between the die and plate, a carriage for said die, said cutting and said turning in means, and means for moving said carriage toward and from the path of said plate and means for reciprocating said die, said cutting means and said turning in means on said carriage whereby they will be caused to travel with the plate while operating on a sheet of dough.

18. In a pie making machine the combination of a plurality of fingers arranged around a circle and adapted to engage a rim of dough held on a pie plate and means for moving said fingers in opposite radial lines to crimp the rim of dough engaged between them.

19. In a pie making machine the combination of means for holding a plate having a sheet of dough thereon with a rim formed around the edge of said plate; a plurality of swinging members arranged in circular form to engage on opposite sides of the rim of dough and means for moving said swinging members oppositely on radial lines to crimp said rim.

20. In a pie making machine the combination of means for supporting a pie plate having a sheet of dough with a rim formed around the edge of said plate; a plurality of members engaging said rim of dough on opposite sides and arranged in circular form; means for causing said members to move in opposite directions on radial lines whereby the outer and inner members pass each other to crimp said rim of dough.

21. In a pie making machine the combination of means for holding a pie plate having a sheet of dough formed with a rim around the edge of the plate; a plurality of levers arranged in circular form and adapted to engage the rim of dough alternately on opposite sides thereof; and a cam acting on said levers to cause said arms to move in radial lines to crimp said rim.

22. In a pie making machine the combination of means for holding a plate having a sheet of dough thereon formed with a rim around the edge of said plate; means for engaging the edge of the plate at various points of the circumference to hold the plate flat; a plurality of members arranged in circular form and adapted to engage the rim of dough on opposite sides thereof; and means for operating said latter members to move them in radial lines to crimp said rim.

23. In a pie making machine a continuously traveling support adapted to hold a pie plate having a sheet of dough thereon formed with a rim around the edge of the plate; a crimping device comprising a plurality of members adapted to engage said rim of dough at opposite sides thereof; means for operating said members in radial lines to crimp the rim of dough, and means for reciprocating said crimping device whereby it will move with the plate while crimping the rim of dough.

24. In a pie making machine the combination of a movable support adapted to hold a plurality of pie plates having a sheet of dough on each plate; a rim forming device and a rim crimping device arranged to operate on the successive plates while carried on said support, and means for causing said rim forming and said crimping devices to move with the plates while operating.

25. In a pie making machine the combination of a continuously traveling support adapted to hold a plurality of pie plates each having a sheet of dough thereon, a carriage and means for reciprocating the carriage vertically of the path of movement of the plates; a rim forming device on said carriage, a rim crimping device on said carriage, and means for reciprocating said rim forming and said crimping devices on said carriage whereby they will move with the plates while co-operating therewith.

Signed in the city, county and State of New York on the 18th day of July, 1923.

JOHN F. KOHLER.